Jan. 19, 1943.　　　　G. TURCO　　　　2,308,944

PRESSURE CONTROL DEVICE

Filed March 7, 1940　　　2 Sheets-Sheet 1

INVENTOR
G. Turco
C. F. Wenderoth
ATTORNEY

Jan. 19, 1943.  G. TURCO  2,308,944
PRESSURE CONTROL DEVICE
Filed March 7, 1940   2 Sheets—Sheet 2
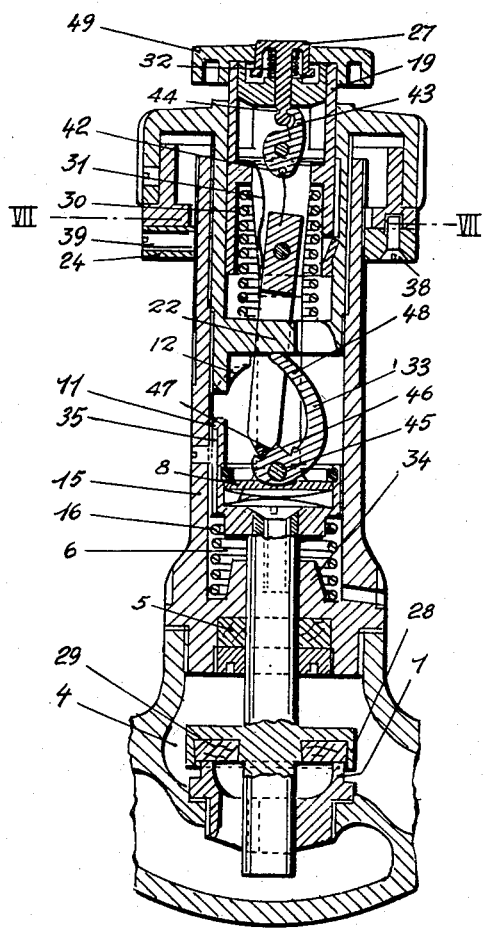
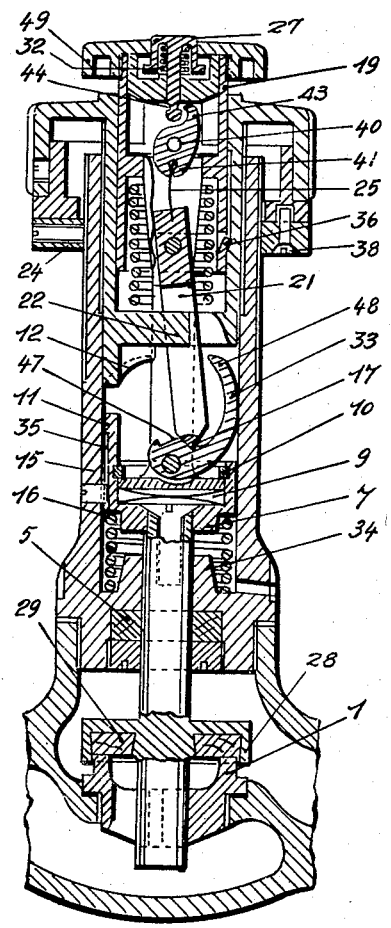
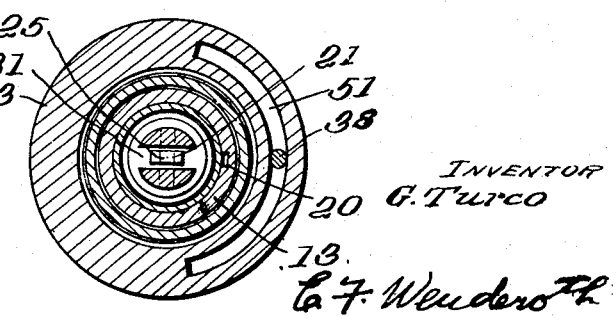
INVENTOR
G. Turco Patented Jan. 19, 1943

2,308,944

UNITED STATES PATENT OFFICE 2,308,944

PRESSURE CONTROL DEVICE

Giosuè Turco, Rome, Italy; vested in the Alien Property Custodian

Application March 7, 1940, Serial No. 322,850
In Italy March 1, 1939

13 Claims. (Cl. 251—137)

This invention relates to a pressure or trigger control device for hydraulic fittings in general.

An object of the invention is to provide a construction of the type indicated whereby upon successively operating the trigger a valve is alternately opened and closed.

A further object of the invention is to provide a manually controlled regulating member for varying the supply of fluid passing the valve.

A further object of the invention is to provide control means for the valve which are completely insulated from the fluid controlled by the valve.

A further object of the invention is to provide an alternating or rotatory cam for effecting the movement of the valve.

A still further object of the invention is to provide means whereby the control of the fluid by the valve is rendered independent of swellings due to the fluid at the valve joint.

With the above and other objects in view, which will become apparent from the detailed description below, the invention is shown in the drawings in which:

Fig. 4 is a sectional view similar to Fig. 1, but with the parts in a different position;

Fig. 6 is a similar view showing the parts in a still another operative position, and Fig. 7 is a sectional view taken upon the section lines VII—VII of Fig. 1.

Figure 1:
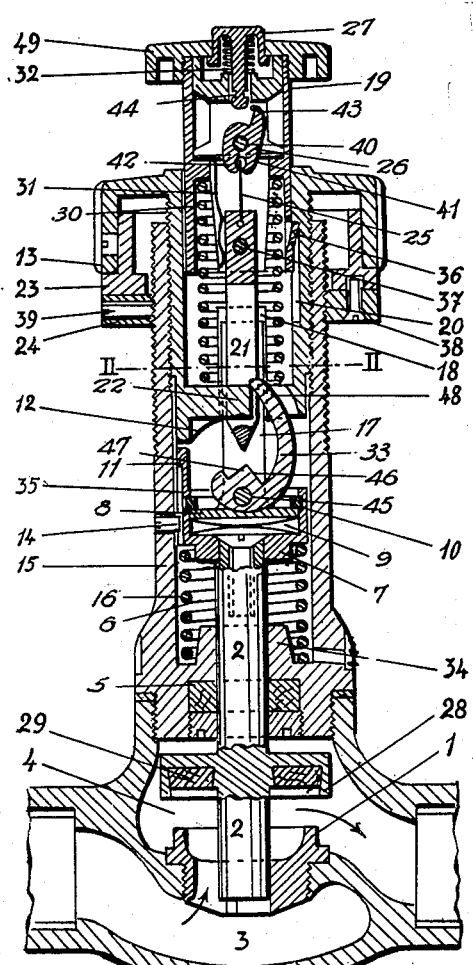
Fig. 1 is a vertical cross sectional view of the control device.
Figure 5:
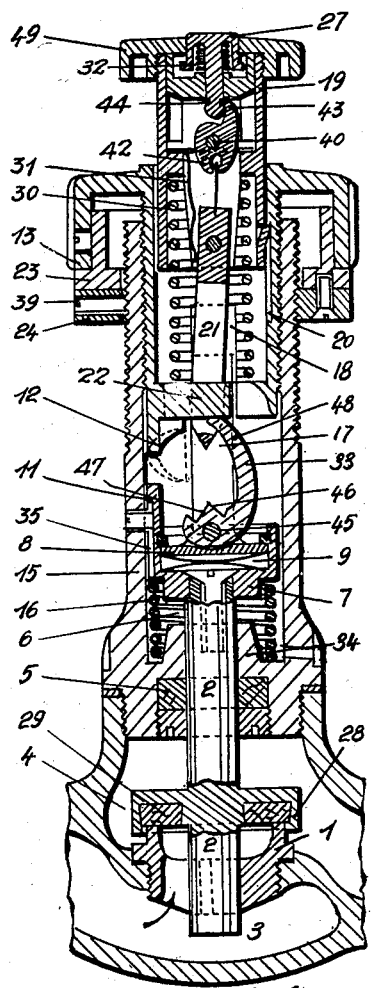
Fig. 5 is a similar view showing the parts in a different operative position.
Figure 2:
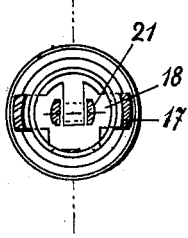
Fig. 2 is a cross sectional view taken on the section line II—II of Fig. 1.
Figure 3:
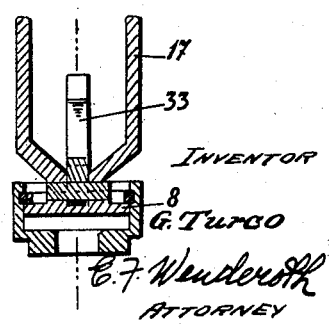
Fig. 3 is a vertical cross sectional view of a detail taken at right angles to the showing of these details in Fig. 1.

Referring to the drawings, the valve seat is shown at 1 and such seat, as clearly shown in the drawing, is interchangeable and also constitutes a guide for the valve stem 2. The inlet pipe is shown at 3 and the outlet pipe at 4. The valve stem 2 extends through a stuffing box 5 and a guiding slot provided in the casing 15 into the chamber 6 in which the control mechanism for the valve is located. The upper end of the valve stem 2 is fixed to a cup-shaped member 7 which serves as a support for the cam supporting member 8. Interposed between the member 8 and the interior bottom of the cup-shaped member are the springs 9, and the springs 9 and the supporting member 8 are fixed in position by the expansion ring 10 seated in a groove provided in the member 7.

The rim of the cup-shaped member 7 is provided at one portion with an extension 11 which is designed to cooperate with a cam surface 12 provided upon a handle or grip 13.

The cup-shaped member 7 as well as the extension 11 thereof is provided with a groove in which extends a key 14 fixed to the casing 15 so that the cup-shaped member as well as the valve stem 2 connected thereto may be permitted to be moved axially but is prevented from rotary motion with respect to the casing. Interposed between the cup-shaped member 7 and the interior bottom of the casing 15 is a spring 16 urging the valve stem and the valve carried thereby to open position. The supporting member 8, to which the cam or eccentric 33 is pivotally connected is provided with two lateral extensions 17 which extend into opposing grooves 18 provided in the grip 13 so that any rotation of the grip or handle 13 will be transmitted to the supporting member 8 and at the same time to the cam 33.

The grip 13 is screw-threadedly engaged with the casing 15 so that the location of the cam surface 12 with relation to the extension 11 may be varied and thereby vary the opening between the valve seat 1 and the valve carried by the valve stem.

The lifting of member 17 is not limited by the end of slot 18 but from the position of the inclined cam surface 12 as determined by the angular position of handle 13 cooperating with projection 11 of plate 7. The member 17 may slide as far as the end of slot 18 only when the handle 13 is completely turned to left, the cam 12 being therefore quite off the path of member 11. Under these conditions the valve stem 2 is lifted to its highest position.

Within the handle or grip 13 and slidably mounted therein is a trigger 19 which is provided with a tooth which engages a groove 20 provided in the grip. Any rotatory motion of the grip therefore will also be transmitted to the trigger carried by the grip and the trigger is prevented from any rotatory motion in relation to the grip while at the same time be capable of axial movement with relation to the grip. The trigger 19 carries a pawl member 21 for operating the cam or eccentric 33 and also for operating the valve stem 2 through the intermediary of such cam 33, the cam supporting member 8, the springs 9 and the cup-shaped member 7. The pawl 21 is grooved so as to receive a tooth 22 provided upon the grip. The pawl 21 is also connected by an elastic member 25 with a pawl 26 which cooperates with an axially movable knob 27 when the valve is closed. When the valve is open the knob 27 projects from the trigger member 19 so that a visual indicator is provided indicating whether the valve is in open or closed position. A spring 31 secured at one end to the trigger bears against the pawl 21 and maintains the pawl in axial position.

The rotation of the grip 13 as indicated above controls the fluid supply passing through the valve. In order to limit the rotation of the grip 13 and provide indicating means for the output of the valve, a ring 23 is fixed to the grip 13 in any desired way and such ring is provided with an indicator and a groove to engage a tooth provided on a ring 24 fixed to the casing 15. Suitable graduations may be placed upon the ring 24 to indicate the output through the valve.

In order to maintain the output of the valve independent of the swelling of the material used in the valve there is provided a metallic ring 28 constructed in the manner shown with the lower portion thereof extending beyond the lower surface of the plastic joint 29 of the valve in such a way that together with the valve seat 1 a stop is formed so that the supply may not be influenced by the swelling of the member 29.

A spring 30 is located between the trigger 19 and the grip 13 tending to raise the trigger 19. A spring 32 is also provided between the knob 27 and the trigger tending to raise such knob.

In order to indicate whether the valve is in open or closed position the pawl member 21 has an elastic extension 25 co-operating with arms 41 and 42 of pawl 26, which is swivelled on axis 40. Said pawl is provided with a tooth 43 engaging by means of yielding extension 25 and arm 41 with groove 44 formed in the stem of knob 27 when the push member 19 is pressed in order to shut the valve. Owing to the engaging of tooth 43 with groove 44, the visual indicator 27 is maintained in a lower position in respect to head 49 of push member 19, the top surfaces of members 27 and 49 being then nearly flush with each other. Under these conditions the valve is closed. On the contrary when one opens the valve, pawl 21 takes an inclination in respect to surface 46 of cam 33 and cooperates by means of its yielding extension 25 with arm 42 of pawl 26, thus disengaging tooth 43 from groove 44. As a consequence the visual indicator 27 under the action of spring 32 protrudes out of head 49 of push member 19, indicating the condition of opened valve.

The operation of the above described device is as follows: In order to close the valve, pressure is applied to the trigger 19 and such trigger slides within the grip 13 and urges the end of the pawl 21 against one of the inclined surfaces provided upon the eccentric or cam 33. The cam 33 is pivotally connected to the supporting member 8, as shown. The movement of the pawl 21, therefore, causes the upper free end of the cam member 33 to bear against the tooth 22 thereby preventing further rotation of such cam and the movement of the pawl 21 is transmitted therefore to the valve stem 2 through the intermediary of the elements 8, 9 and 7. Upon downward movement of the valve stem 2 the upper end of the cam 33 will clear the lower end of the tooth 22 and snap into locking position thereunder and the valve is therefore closed and locked in closed position.

Upon freeing the trigger 19, such trigger will return to its original position under the action of the spring 30. The pawl 21, therefore, rises and upon rising, the end of such pawl will be in position to act upon the other inclined faces of the member 33 upon a subsequent depression of the trigger 19. The flexible member 25 permits the axis of the pawl 21 to be inclined with respect to the axis of the entire device.

Upon again depressing the trigger member 19 the lower end of the pawl 21 will strike the other inclined face provided on the cam 33 and since such inclined face is to the right of the pivot point of the cam 33, as shown in the drawing, the cam 33 will be pivoted in clockwise fashion thereby removing the upper end thereof from the underface of the tooth 22. The springs 9 aid in this freeing of the upper end of the cam 33 from the tooth 22 by permitting a slight axial movement of the cam 33 thereby eliminating friction between the upper end of the cam 33 and the tooth 22. Upon release of the trigger 19 therefore the spring 30 will return the trigger 19 to its original position and at the same time the spring 16 acting upon the member 7 will return the valve stem 2 to its original position and thereby open the valve. The pressure of the fluid also aids in the opening of the valve.

The amount of fluid flowing through the valve is controlled by the angular position of the inclined surface 12 with respect to the extension 11 upon the member 7 and the actual flow is determined by the relative positions of the metal ring 28 and the valve seat 1.

I claim:

1. A control device comprising a valve seat, a valve for cooperating with said seat, a stem on said valve, means controlling the axial movement of said stem and thereby varying the fluid supply, slidable means for urging said valve to closed position on said valve seat and means under the control of said slidable means for locking said valve in closed position.

2. A control device comprising a valve seat, a valve for cooperating with said seat, a stem on said valve, rotatory means controlling the axial movement of said stem and thereby varying the fluid supply, slidable means for urging said valve to closed position on said valve seat and means under the control of said slidable means for locking said valve in closed position.

3. A control device comprising a valve, a stem on said valve, an interchangeable valve seat cooperating with said valve and serving as a guide for said valve stem, said valve comprising a metal ring to control the fluid supply passing between said valve seat and said valve, means controlling the axial movement of said stem and thereby varying the fluid supply, slidable means for urging said valve to closed position on said valve seat and means under the control of said slidable means for locking said valve in closed position.

4. A control device comprising a valve seat, a valve cooperating with said seat, a stem on said valve, slidable means for closing said valve on said seat and means under the control of said slidable means for locking said valve in closed position.

5. A control device comprising a valve seat, a valve cooperating with said seat, a stem on said valve, slidable means for closing said valve on said seat, a locking cam controlled by said slidable means for locking said valve in closed position and a resilient connection between said cam and said stem.

6. A control device comprising a valve seat, a valve cooperating with said seat, a stem on said valve, slidable means for closing said valve on said seat, a locking cam having oppositely inclined faces cooperating with said slidable means, said slidable means when cooperating with one of said faces urging said cam to locking position and when cooperating with the other face urging said cam to released position so that successive movements of said slidable means in the same direction will alternately close and open said valve.

7. A control device comprising a valve seat, a valve cooperating with said seat, a stem on said valve, slidable means for closing said valve on said seat, a locking cam having oppositely inclined faces cooperating with said slidable means, said slidable means when cooperating with one of said faces urging said cam to locking position and when cooperating with the other face urging said cam to released position so that successive movements of said slidable means in the same direction will alternately close and open said valve and a resilient connection between said cam and said valve stem.

8. A control device comprising a valve seat, a valve cooperating with said seat, a stem on said valve, slidable means for closing said valve on said seat, a casing within which said stem reciprocates, a projection secured to said stem, a grip rotatively mounted in said casing and a cam track on said grip cooperating with said projection in order to limit the reciprocation of said stem and thereby control the fluid volume passing said valve.

9. A control device comprising a valve seat, a valve cooperating with said seat, a stem on said valve guided by said valve seat, a casing surrounding said valve stem, a stuffing box carried by said casing through which said valve stem projects, a member secured to said valve stem slidingly mounted within said casing, means coacting with said member normally urging said valve to open position, means also coacting with said member controlling the extent of reciprocation of said valve stem and means slidable within said last named means for actuating said valve, (an eccentric flexibly connected to said member) and slidable means cooperating with said eccentric for operating said valve to closed or released position.

10. A control device comprising a valve, a valve stem on said valve, a casing enclosing said valve stem, a member reciprocating in said casing secured to said stem, a projection upon said member, a grip rotatively mounted upon said casing, a cam member upon said grip cooperating with said projection to regulate the amount of opening of said valve and a trigger slidingly mounted in said grip for actuating said valve.

11. A control device comprising a valve, a valve stem on said valve, a casing enclosing said valve stem, a member reciprocating in said casing secured to said stem, a projection upon said member, a grip rotatively mounted upon said casing, a cam member upon said grip cooperating with said projection to regulate the amount of opening of said valve, a cam supporting member resiliently mounted on said member secured to said stem, an eccentric pivotally secured to said cam supporting member, a tooth on said grip to cooperate with said eccentric in order to lock said valve in closed position and a resiliently slidably mounted trigger in said grip for actuating said eccentric to closed or released position and reciprocating said valve to closed position.

12. A control device comprising a valve, a valve stem on said valve, a casing enclosing said valve stem, a member reciprocating in said casing secured to said stem, a projection upon said member, a grip rotatively mounted upon said casing, a cam member upon said grip cooperating with said projection to regulate the amount of opening of said valve, a cam supporting member resiliently mounted on said member secured to said stem, an eccentric pivotally secured to said cam supporting member, a tooth on said grip to cooperate with said eccentric in order to lock said valve in closed position, a resiliently slidably mounted trigger in said grip for actuating said eccentric to closed or released position and reciprocating said valve to closed position and visual indicating means carried by said trigger indicating when the valve is in closed and open position.

13. A control device comprising a valve, a valve stem on said valve, a casing enclosing said valve stem, a member reciprocating in said casing secured to said stem, a projection upon said member, a grip rotatively mounted upon said casing, a cam member upon said grip cooperating with said projection to regulate the amount of opening of said valve, a cam supporting member resiliently mounted on said member secured to said stem, an eccentric pivotally secured to said cam supporting member, a tooth on said grip to cooperate with said eccentric in order to lock said valve in closed position, a resiliently slidably mounted trigger in said grip for actuating said eccentric to closed or released position and reciprocating said valve to closed position.

GIOSUÈ TURCO.